United States Patent [19]
Timmons et al.

[11] Patent Number: 5,637,814
[45] Date of Patent: Jun. 10, 1997

[54] APPARATUS FOR HOLDING A DEVICE IN ABUTTING RELATION WITH A WORKPIECE

[75] Inventors: Tom Timmons, Smithville; Mark Yelverton, Austin, both of Tex.

[73] Assignee: Advanced Micro Devices, Austin, Tex.

[21] Appl. No.: 291,972

[22] Filed: Aug. 17, 1994

[51] Int. Cl.6 .................................................. G01D 21/00
[52] U.S. Cl. ....................................................... 73/866.5
[58] Field of Search .......................... 73/866.5, 864.91, 73/866.1, 432.1; 374/208

[56] References Cited

U.S. PATENT DOCUMENTS

| | | | |
|---|---|---|---|
| 3,973,441 | 8/1976 | Porter | 73/866.5 |
| 4,495,808 | 1/1985 | Fischer, III | 73/866.5 |
| 4,747,317 | 5/1988 | Lara | 73/866.5 X |
| 4,843,896 | 7/1989 | Napeloni et al. | 73/866.5 |
| 5,195,392 | 3/1993 | Moore et al. | 73/866.5 |
| 5,325,734 | 7/1994 | Jordan | 73/866.5 |
| 5,329,824 | 7/1994 | Carapezza et al. | 73/866.5 |
| 5,471,887 | 12/1995 | Laub | 73/866.5 |

*Primary Examiner*—Elizabeth L. Dougherty
*Attorney, Agent, or Firm*—Foley & Lardner

[57] ABSTRACT

An apparatus for holding a rod-shaped device in an abutting relationship with a workpiece comprises a bar with a bias structure coupled with the bar and the workpiece. The bar has an aperture which is proportioned to pass the rod-shaped device when the bar member is in a first orientation with respect to an axis about which the device is oriented, and to effect binding engagement between the bar and the rod-shaped device when the bar is in a second orientation with respect to the axis. The bias structure urges the bar to the second orientation.

12 Claims, 4 Drawing Sheets

APPARATUS FOR HOLDING A DEVICE IN ABUTTING RELATION WITH A WORKPIECE

BACKGROUND OF THE INVENTION

The present invention involves an apparatus for holding a device in abutting relation with a workpiece, especially a bracket for holding a thermocouple against a quartz tube in a semi conductor diffusion furnace used in manufacturing semiconductor devices.

Past thermocouple mounting systems allow the thermocouple to fall out or to lose intimate contact with the device for which temperature is to be monitored: e.g., the quartz tube in a semiconductor diffusion furnace. Several approaches have been attempted: clamps, ceramic blocks, and other apparatus. It is important in all of these holding devices that the thermocouple stay in contact with the quartz tube. Previous holding devices for thermocouples have had a tendency to work loose either because of vibration (e.g., from vacuum pumps associated with the system) or because of thermal cycling. Repeated expansion and contraction as the apparatus is heated and cooled during normal operations causes the thermocouple to work loose from its intimate contact with the quartz tube. The latter reason (i.e., thermal cycling) is the most common cause of such loosening of thermocouples.

In the environment in which the preferred embodiment of the present invention is used, the quartz tube is located inside a diffusion furnace, and it is within the quartz tube itself that the semiconductor materials are thermally treated. Quartz tubes are changed periodically; they comprise a liner inside the furnace which is surrounded by the furnace housing and heating coils. The frequency with which quartz tubes are changed depends upon the process in which they are employed, but such quartz tube changing may occur as often as every 40 process cycles (i.e., approximately every 10 days).

When a new or cleaned quartz tube is inserted, the control system must be set up to sense temperature of the quartz tube at predetermined locations and upon the insertion of the new quartz tube into the furnace, the control system must reestablish a profile for proper processing of the semiconductor devices. That is, the control system must heat the furnace and the installed quartz tube, stabilize the system (the furnace and tube), measure the thermocouple's temperatures against the outside of the quartz tube, measure the temperature inside the chamber, and establish temperature offsets to use during processing. This profiling process generally takes 5 to 6 hours.

Presently available (prior art) thermocouple hold downs, with their propensity to fail to keep the thermocouples in place against the outside of the quartz tube, are a large part of the reason for control systems failing to properly profile a system when a new quartz tube is installed. Operators using such improperly profiled systems and apparatus will find that a thermocouple is, for example, running too hot or too cold to be properly employed to accurately measure temperature at a predetermined point. In such cases, repositioning the thermocouple against the quartz tube is required, and profiling must be reestablished. Thus, an additional 5 to 6 hours of processing time is lost in reestablishing profiling.

Further, the only method operators have to detect and determine thermocouple displacement during operation is product quality degradation. Loose thermocouples result in degraded process control which, further, results in poor or degraded product.

Another shortcoming of other attempts to overcome the problems of thermocouple hold downs is that previous attempts, because of too great of mass and too large of contract area, have degraded thermocouple response.

There is, therefore, a need for an apparatus for holding a device in an abutting relation, especially for holding a thermocouple in an abutting relation with a quartz tube in a semiconductor diffusion furnace, which will firmly hold the thermocouple in place despite vibration or thermal cycling which may occur.

It is a further requirement that the apparatus for holding a thermocouple in such an abutting relation have sufficient high temperature properties to withstand the rigors of the environment in which it is employed to be able to withstand heat without melting or otherwise deforming. This is an important consideration since thermocouples may measure up to about 1,200° C.

SUMMARY OF THE INVENTION

An apparatus for holding a device in an abutting relationship with a workpiece. The device has a rod-like section oriented substantially about an axis. The apparatus comprises a bar member and a bias structure coupled with the bar member and with the workpiece. The bar member has an aperture which is proportioned to pass the rod-like section of the device when the bar member is in a first orientation with respect to the axis and to effect binding engagement between the bar member and the rod-like section when the bar member is in a second orientation with respect to the axis. The bias structure urges the bar member to the second orientation.

It is, therefore, an object of the present invention to provide an apparatus for holding a device in an abutting relation with a workpiece which maintains that abutting relation in the presence of vibration or thermal cycling.

It is a further object of the present invention to provide an apparatus for holding a device in an abutting relation with a workpiece which is made with a material of high melting point to preclude deformation when employed in connection with a semiconductor diffusion furnace.

Further objects and features of the present invention will be apparent from the following specifications and claims when considered in connection with the accompanying drawings illustrating the preferred embodiment of the invention.

BRIEF DESCRIPTIONS OF THE DRAWINGS

DETAILED DESCRIPTION OF THE INVENTION

Figure 1:
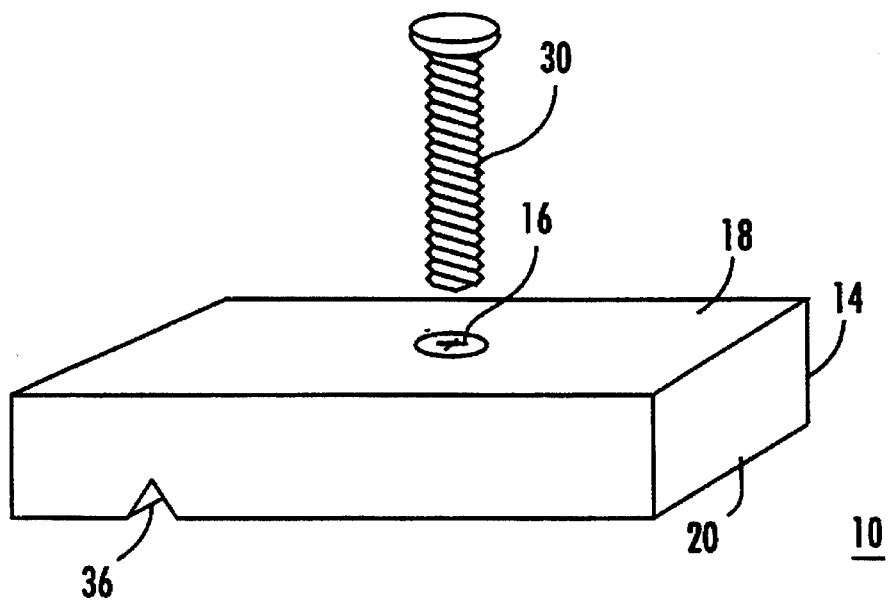
FIG. 1 is an exploded perspective drawing of one example of a prior art hold-down apparatus for use with a thermocouple device.
Figure 1:
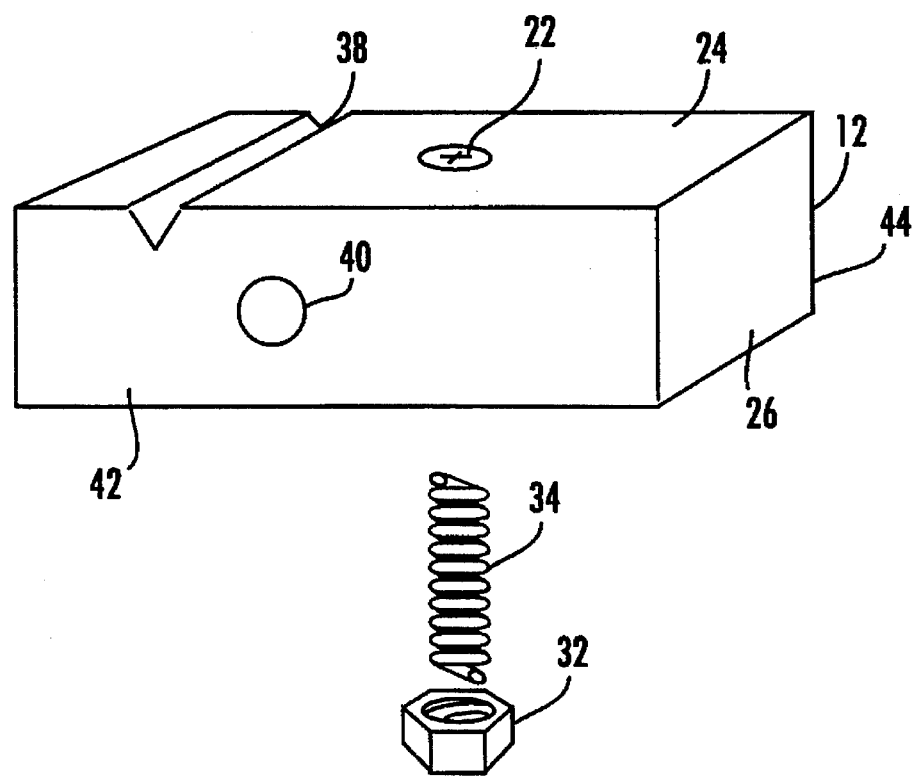

FIG. 1 is an exploded perspective drawing of one example of a prior art hold-down apparatus for use with a thermocouple device. In FIG. 1, a hold-down apparatus 10 is illustrated as including a lower block 12 and an upper block 14. Lower block 12 and upper block 14 are preferably made of a heat resistant material, and most commonly are made of a ceramic material. An aperture 16 traverses upper block 14 from its top face 18 through its bottom face 20. An aperture 22 traverses lower block 12 from its upper face 24 to its lower face 26. Apertures 16, 22 are substantially oriented about an axis 28 when upper block 14 and lower block 12 are in register poised for assembly, as illustrated in FIG. 1. Thus, apertures 16, 22 are substantially coaxial when hold-down apparatus 10 is assembled with bottom face 20 of upper block 14 substantially adjacent upper face 24 of lower block 12. Hold-down apparatus 10 is maintained in that assembled position by a threaded fastener 30, a nut 32 and a bias member 34 such as a compression spring which is compressively held intermediate nut 32 and lower face 26 of lower block 12 when threaded fastener 30 passes through bias member 34 and is threadedly engaged with nut 32. A channel 36 is provided in bottom face 20 of upper block 14, and a channel 38 is provided in upper face 24 of lower block 12. Channels 36, 38 are substantially complementary and form a single channel when hold-down apparatus 10 is assembled as described above. Channels 36, 38 cooperate to hold a rod-like thermocouple intermediate lower block 12 and upper block 14 when hold-down apparatus 10 is assembled.

There is a further aperture 40 which traverses lower block 12 from its front face 42 through its rear face 44. Aperture 40 is provided to accommodate a mounting fastener (not shown in FIG. 1) to mount hold-down apparatus 10 to a workpiece (not shown in FIG. 1) against which a thermocouple may be held by hold-down apparatus 10 in channels 36, 38.

Figure 2:
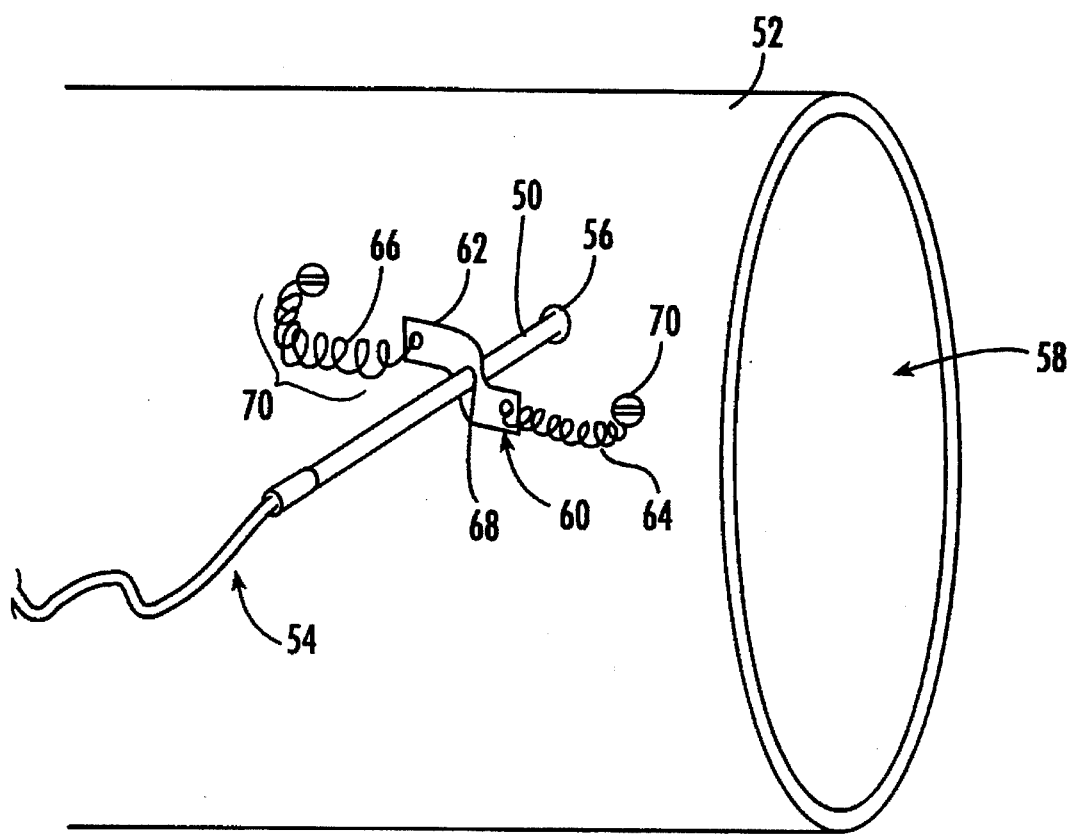
FIG. 2 is a perspective drawing of a thermocouple mounted with a semiconductor diffusion furnace employing the preferred embodiment of the present invention.

FIG. 2 is a perspective drawing of a thermocouple mounted with a semiconductor diffusion furnace employing the preferred embodiment of the present invention. In FIG. 2, a thermocouple 50 is illustrated with a diffusion furnace 52. Thermocouple 50 is generally rod-like in structure and provides leads 54 for transmitting a signal indicative of the temperature sensed by thermocouple 50. Thermocouple 50 traverses diffusion furnace 52 through an aperture 56 in order to maintain intimate physical contact with a quartz tube (not shown in FIG. 2) situated in the interior 58 of diffusion furnace 52.

Hold-down apparatus 60 maintains the required intimate physical contact between thermocouple 50 and the quartz tube. Hold-down apparatus 60 comprises a bar member 62 and a bias means consisting (in the preferred embodiment) of a pair of springs 64, 66 connecting bar member 62 with diffusion furnace 52 via screws 70. Thermocouple 50 passes through an aperture 68 in bar member 62. Springs 64, 66 are under tension when hold-down apparatus 60 is installed with thermocouple 50. Thus, springs 64, 66 apply force to bar member 62 to urge bar member 62 toward diffusion furnace 52. Bar member 62 is oriented in a cocked position with respect to thermocouple 50 so that aperture 68 is in a binding orientation with respect to thermocouple 50 and maintains a gripping relation with thermocouple 50. In this installed orientation, springs 64, 66 urge thermocouple 50 against the quartz tube (not shown in FIG. 2).

In order to facilitate understanding the invention, like elements will be referred to by like reference numerals in the various drawings.

Figure 3:
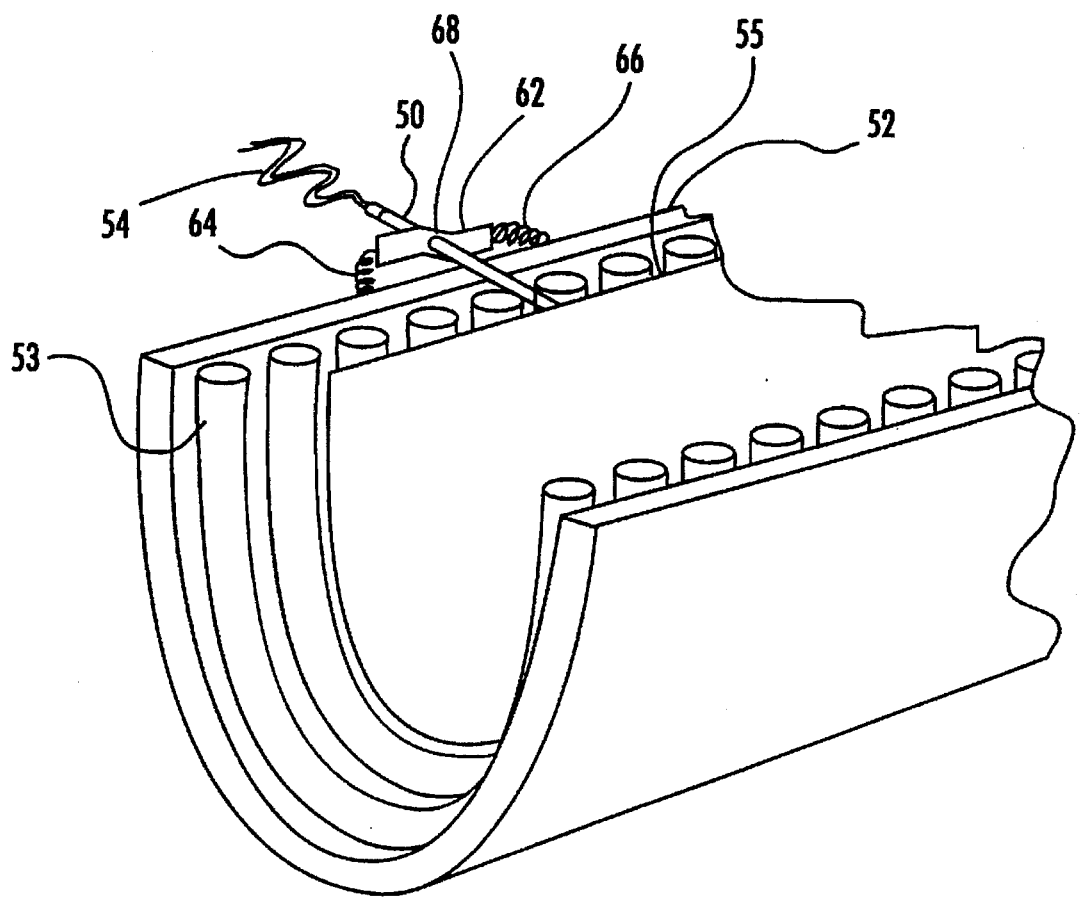
FIG. 3 is a schematic cutaway drawing of a thermocouple deployed in connection with operation of a semiconductor diffusion furnace using the preferred embodiment of the present invention.

FIG. 3 is a schematic cut-away drawing of a thermocouple deployed in connection with operation of a semiconductor diffusion furnace using the preferred embodiment of the present invention. In FIG. 3 a diffusion furnace 52 is shown in cut-away fashion revealing a plurality of heating coils 53 arrayed about a quartz tube 55. Thermocouple 50 passes through aperture 56 in diffusion furnace 52 to contact quartz tube 55 so that thermocouple 50 may monitor the temperature of quartz tube 55. Hold-down apparatus 60, comprising a bar member 62 and springs 64, 66 engages thermocouple 50 by stretching springs 64, 66 and cocking bar member 62 to effect binding engagement between aperture 68 and thermocouple 50. The binding engagement is effected and maintained by the bias force provided by springs 64, 66. Leads 54 provide signals to an outside monitoring station (not shown in FIG. 3) indicating temperatures sensed by thermocouple 50 in its abutting engagement with quartz tube 55.

Figure 4:
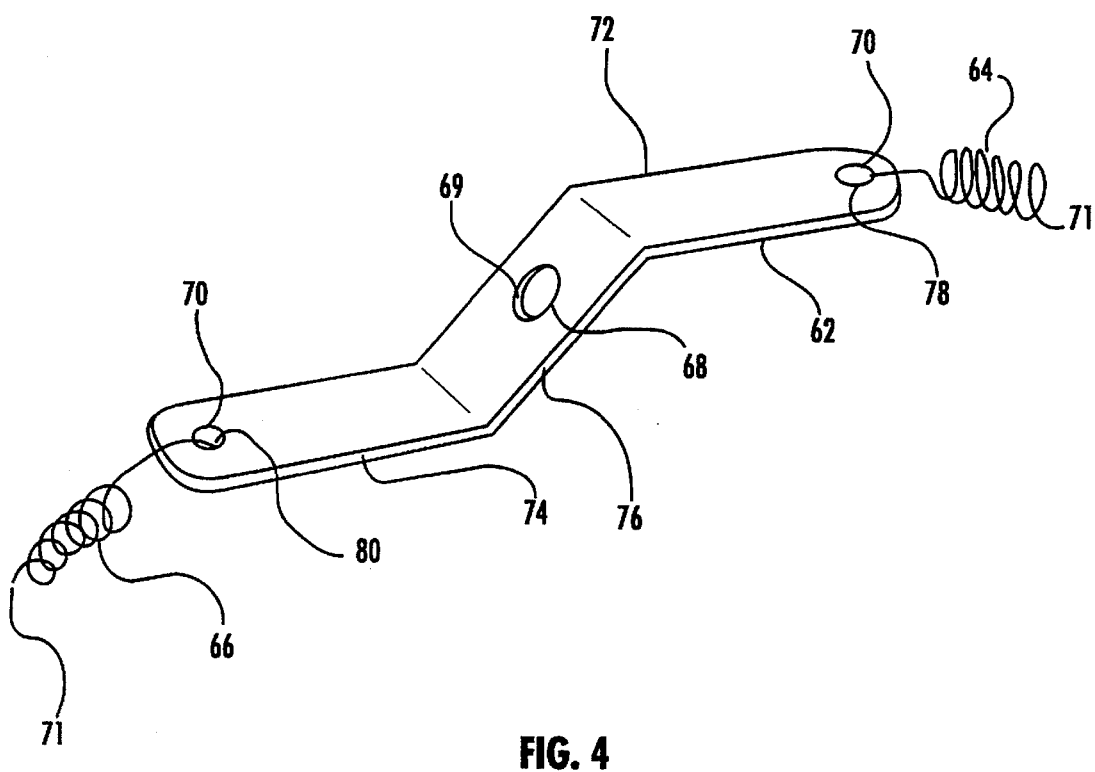
FIG. 4 is a perspective drawing of the preferred embodiment of the present invention.

FIG. 4 is a perspective drawing of the preferred embodiment of the present invention. In FIG. 4, a hold-down apparatus 60 is illustrated as including a bar member 62 and a bias means comprising spring members 64, 66. Spring members 64, 66 are attached with bar member 62 by screws 70 and are configured for attachment by screws 70 (not shown in FIG. 4) at distal ends 71 with a workpiece (not shown in FIG. 4), such as a diffusion furnace 52 (see FIGS. 2, 3). Bar member 62 has an aperture 68 establishing aperture walls 69.

Bar member 62 is preferably a plate-like structure including a first plate 72, a second plate 74, and a middle plate 76. Preferably, aperture 68 penetrates bar number 62 through middle plate 76. First plate 72, second plate 74, and middle plate 76 are preferably joined in an integral rigid structure. Spring 64 is attached with first plate 72 at a first attachment point 78; spring 66 is attached with second plate 74 at a second attachment point 80. First attachment point 78 as displaced from middle plate 76 a first distance, and second attachment point 80 is displaced from middle plate 76 a second distance. By providing bias forces to points 78, 80 of bar member 62 which are offset from aperture 68 through which a thermocouple (not shown in FIG. 4) passes, cocking force is applied to bar member 62 by spring 64, 66 subject to moment arms provided by the first distance and second distance from aperture 68.

Thus, a thermocouple 50 (FIGS. 2, 3) passing through aperture 68 may be biasedly maintained against a workpiece to which springs 64, 66 are attached at distal ends 71 when springs 64, 66 are stretched in order that a bias force may be applied urging bar member 62 toward the workpiece (not shown in FIG. 4). Bar member 62 may be oriented in a cocked position with respect to the axis of thermocouple 50 to establish thermocouple 50 in a binding relation with the walls 69 of aperture 68. The bias forces exerted by springs 64, 66 on thermocouple 50 when such a binding relation is established maintain the binding relation and apply a force substantially axially along thermocouple 50 toward the workpiece to which springs 64, 66 distal ends 71 are attached. In such manner, the required intimate physical contact between workpiece and thermocouple required for accurate temperature measurement is maintained.

It is to be understood that, while the detailed drawings and specific examples given describe preferred embodiments of the invention, they are for the purpose of illustration, that the apparatus of this invention is not limited to the precise details and conditions enclosed and that various changes may be made therein without departing from the spirit of the invention which is defined by the following claims.

What is claimed is:

1. An apparatus for holding a device in abutting relation with a workpiece; said device having a rod-like section oriented substantially about an axis; the apparatus comprising:

a bar member; and a bias means coupled with said bar member and with said workpiece;

said bar member having an aperture; said aperture being proportioned to pass said rod-like section when said bar member is in a first orientation with respect to said axis; said aperture being proportioned to effect binding engagement between said bar member and said rod-like section when said bar member is in a second orientation with respect to said axis;

said bias means urging said bar member to said second orientation wherein said bar member is a substantially plate-like structure including a first plate, a second plate, and a middle plate; said middle plate integrally joining said first plate and said second plate; said aperture being located in said middle plate; said first plate and said second plate being substantially rectangularly shaped in two respective substantially parallel planes.

2. An apparatus for holding a device in abutting relation with a workpiece as recited in claim 1 wherein said bias means comprises a first spring in tension intermediate said workpiece and a first attachment point on said bar member and a second spring in tension intermediate said workpiece and second attachment point on said bar member; said first attachment point being located a first distance from said middle plate on said first plate; said second attachment point being located a second distance from said middle plate on said second plate.

3. An apparatus for holding a device against a workpiece; said device having a generally cylindrical configuration substantially symmetrical about an axis; the apparatus comprising:

an engaging means for engagingly interacting with said device; and a bias means for biasing said engaging means toward said workpiece; said bias means being coupled with said engaging means and with said workpiece;

said engaging means including a first arm substantially in a first plane, a second arm substantially in a second plane, and an engagement segment connecting said first arm and said second arm in a unitary rigid structure; said first plane being substantially parallel with said second plane; said engagement segment having an aperture, said aperture being defined by at least one aperture wall traversing said engagement segment; said aperture freely surroundingly clearing said device when said engaging means and said device are in a first orientation; said at least one aperture wall bindingly engaging said device when said engaging means and said device are in a second orientation;

said bias means urging said engaging means to said second orientation to effect said holding wherein said first arm, said second arm, and said engagement segment are each substantially a plate-like structure, said first arm being substantially rectangular in said first plane, said second arm being substantially rectangular in said second plane, said engagement segment being substantially rectangular in a third plane.

4. An apparatus for holding a device against a workpiece as recited in claim 3 wherein said bias means comprises a first spring in tension intermediate said workpiece and a first attachment point on said engaging means and a second spring in tension intermediate said workpiece and second attachment point on said engaging means; said first attachment point being located a first distance from said engagement segment on said first arm; said second attachment point being located a second distance from said engagement segment on said second arm.

5. A mounting system for a rod-like sensing device utilized with a semiconductor fabrication tube, the mounting system comprising:

an engagement element having a first arm substantially in a first plane, a second arm substantially in a second plane, and an engagement segment connecting the first arm and the second arm, the first plane being substantially parallel with the second plane, the engagement segment having an aperture, the aperture being defined by at least one aperture wall traversing the engagement segment, the aperture freely surroundingly clearing the rod-like sensing device when the engagement element and the device are in a first orientation, the at least one aperture wall bindingly engaging the rod-like sensing device when the engagement element and the device are in a second orientation; and a bias element coupled to the engagement element, the bias element biasing the engagement element towards the semiconductor fabrication tube and urging the engagement element to the second orientation to effect the holding, and wherein the first arm, the second arm and the engagement element are each substantially a plate-like structure, the first arm being substantially rectangular in the first plane, the second arm being substantially rectangular in the second plane and the engagement element being substantially rectangular in a third plane.

6. The mounting system of claim 5 wherein the semiconductor fabrication tube is a cylindrical device, the bias element being mechanically coupled to an outside surface of the semiconductor fabrication tube.

7. The mounting system of claim 5 wherein the rod-like sensing device is a thermal couple.

8. The mounting system of claim 6 wherein the semiconductor fabrication tube is a quartz tube.

9. The mounting system of claim 8 wherein the quartz tube is placed in a semiconductor fabrication diffusion furnace.

10. The mounting system of claim 5 wherein the bias element includes a first spring and tension intermediate the semiconductor fabrication tube and a first attachment point on the first arm and a second spring in tension intermediate the semiconductor fabrication tube.

11. The mounting system of claim 5 wherein the engagement element is a unitary piece.

12. The mounting system of claim 5 wherein the bias element is attached to the engagement element by screws.

* * * * *